July 3, 1928.
L. E. ONEAL
1,675,989
ANNUNCIATOR SYSTEM
Filed Nov. 27, 1922
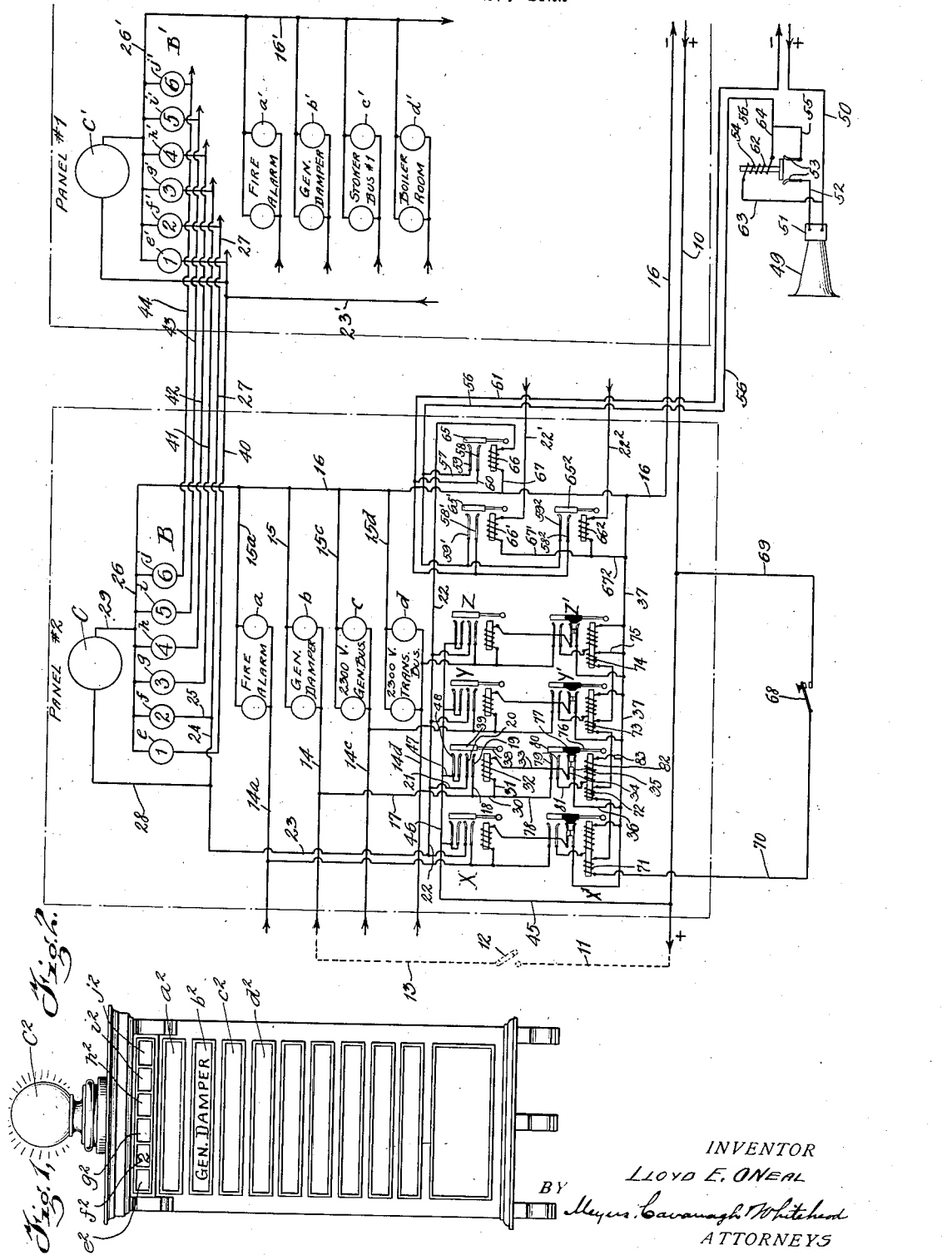
INVENTOR
LLOYD E. ONEAL
BY
Meyers, Cavanagh Whitehead
ATTORNEYS

UNITED STATES PATENT OFFICE.

LLOYD E. ONEAL, OF EAST ORANGE, NEW JERSEY, ASSIGNOR TO CHAS. CORY & SON, INCORPORATED, OF NEW YORK, N. Y., A CORPORATION OF NEW YORK.

ANNUNCIATOR SYSTEM.

Application filed November 27, 1922. Serial No. 603,546.

This invention relates to annunciator apparatus and more particularly to an annunciator system especially applicable to power plants and the like, and has special reference to the provision of a system of this nature designed for indicating with rapidity and efficiency an abnormal state or condition in plant equipment so that any defect in the same may be quickly detected and remedied.

The immense size of modern power stations, and the urgent and uninterrupted need for electrical power both by the manufacturer and the public, make it imperative that every available means be utilized to keep the power equipment and electrical system in constant operation. To keep the plant in continuous service it is essential when a defect or breakdown occurs in any given piece of plant apparatus, to remedy the defect and place the apparatus in normal operating condition as rapidly as possible, this demanding efficient and quick detection of the nature of the trouble and its source.

In most power plants the common method for indicating the presence of a defect or trouble is by the sounding of code alarms as from air whistles, electric sirens, bells or the like. These audible signals in relating to so many pieces of apparatus making up the plant equipment have increased in such great numbers at many power houses that the attendants forget the codes and when an alarm is given confusion results and much time is lost in detecting the nature and location of the defect. To obviate this objection and others inherent in known systems, the present annunciator system was devised, and a principal object of the present invention comprehends the provision of a system in which the nature and source of a defect will be indicated and designated reliably and rapidly, and in a manner so that the station attendant may be in a position to intelligently handle the situation and efficiently apply the remedy.

In a modern power station the plant equipment comprises numerous machines and apparatuses coordinated by relatively complex electrical systems with the machinery distributively located over a relatively large plant area. One of the serious problems with which the attendant is confronted in time of trouble is that of being quickly apprised which piece of apparatus of many requires immediate attention, and of being intelligently directed to that part of the plant demanding his presence. I have found that this problem may be desirably solved by subdividing the plant into a plurality of visible signalling stations or units, the signalling stations or units being distributively located over the plant with each unit forming a central signalling station for equipment local to such station, the stations being so inter-related that every station or unit will designate that unit at which any given trouble is visibly indicated and from which such trouble may be properly traced. With the visible signalling means I further combine an audible signalling mechanism for calling the attendant's attention to the presence of a visible indication at one of the signalling stations. By this system the engineer or repairman may be quickly informed by the signalling unit nearest to him which signaling station is reporting the defect, and upon arrival at such latter station the exact nature and location of the defect will be revealed to him.

It ofttimes occurs that a defect in a machine is of a transitory nature and that the trouble ceases before the attendant learns of its source. This is discouraging to the repairman and renders uncertain his management of the plant, this working "in the dark" causing an uneasiness which is at times very disconcerting. Moreover a transitory trouble requires attention and the curing of a defect of this kind may avoid a future and permanent failure in the apparatus. By my present annunicator system such transitory and self-restoring abnormal conditions in plant apparatus are indicated by the signalling system, and are moreover indicated in such a manner that the repairman may learn with ease whether or not the signalled defect is a self-corrected one, giving him undoubted guidance in the taking of the desired curative action.

Another important factor in the designing of an annunciator system of the kind above referred to is that of providing for the proper and rapid detection of a defect occurring soon after the occurrence of another defect, or during the time that such latter defect is being attended to. It is desirable that the inter-related units or signalling stations, all of which designate the local station requiring attention, should always and uninterruptedly be in a condition to perform like service in the event that the existence of another defect is to be noted or registered. It is therefore a further object of my invention to provide a system in which this is made possible, and in which the designations may be cleared without clearing the signal indication so as to permit the existence of other defects to be designated.

The principal objects of my present invention may be said to include besides the provision of a system having the characteristics and capable of functioning as above described, the further provision of a system in which the generating and operating units of a power plant are protected by signalling means consisting of a plurality of panels distributively located over the plant, each panel being local to a main generating unit; the further provision of a system in which each panel or signalling unit includes signalling means for indicating the integrity of the apparatus local to the station and for designating that panel or unit at which the trouble is being recorded associated with audible signalling means for denoting the existence of signalling indications; the further provision of an audible signalling means operable for a predetermined period of time; the still further provision of a system of the nature referred to in which the signal indications and the unit designations persist regardless of the self-restoration of the apparatus protected or the self-correction of the trouble therein; the further provision of a system of this kind in which the designating means may be cleared by the attendant without clearing the signal indications and in which the act of clearing will designate whether or not transitory or permanent defect or trouble exists, and the still further provision of an annunciator system in which the parts are inter-related in a very simple manner consistent with the manifold functions intended to be performed.

To the accomplishment of the foregoing and such other objects as may hereinafter appear my invention consists in the elements and their relation one to the other as hereinafter particularly described and sought to be defined in the claims, reference being had to the accompanying drawings which show a preferred embodiment of my invention and in which:—

Figure 1 is a front elevational view of a mechanical construction of one of the signalling units, and Figure 2 is a wiring diagrammatic view of a plurality of inter-related signalling units.

As heretofore mentioned one of the principal objects of my present invention comprehends the provision of a system in which a plurality of signalling units are distributively located over the plant, each unit comprising a central signalling station for equipment local thereto and in which the stations are so inter-related that every station or unit will designate that unit at which any given trouble is visibly indicated and from which the trouble may be traced. To this end I provide a plurality of units which for purposes of illustration are shown two in number including the panels designated in Fig. 2 as panel #1 and panel #2, one of the panels being shown fully wired and the other partially wired, the panels being so inter-connected as to produce the desired result. Each of the panels includes a plurality of visible signals connected with the plant apparatus for indicating an abnormal condition therein, such signals comprising, for example, on panel #2, the signals $a$, $b$, $c$, and $d$ associated with the "fire alarm" system, the "generator damper", the "2300 volt generator bus" and the "2300 volt transformer bus" respectively, of one generating unit of a plant, and the signals $a'$, $b'$, $c'$ and $d'$ of the panel #1 associated with similar apparatus of another generating unit of the plant as indicated by legends in the figure, it being understood that a number of these panels or units, such for example as six or more units, may be provided for a given plant.

Each panel or signalling unit further includes designating means for designating that unit on which an apparatus defect is being indicated, and to this end the panels are provided with the unit designating means generally designated as B and B' in panels #2 and #1 respectively, the designating means of each panel comprising a plurality of signalling elements such as $e$, $f$, $g$, $h$, $i$ and $j$ on panel #2, and $e'$, $f'$, $g'$, $h'$, $i'$ and $j'$ on panel #1, the signalling elements preferably comprising unit lights which are adapted to be illuminated upon the occurence of trouble and which are numbered in correspondence to the number of units or signalling panels in the plant as 1, 2, 3, etc., as is clearly shown in the drawings, this designating means being so operated as will be presently described in detail that all the panels will directively designate that panel on which an abnormal condition indication is present.

For further quickly designating the recording panel or unit each panel is further provided with a pilot light such as C and C' for panel #2 and panel #1 respectively, these pilot lights being operated for distinctively indicating the trouble recording unit.

The constructional features of a panel are shown in Fig. 1 of the drawing and having reference to this figure it will be noted that the signal indications may be made to appear at a plurality of windows $a^2$, $b^2$, $c^2$, $d^2$, etc., the window $b^2$ indicating for example the closing of the generator damper which may indicate an abnormal operation of the damper or the occurrence of a fire in the generator. The unit designating signals may likewise appear at the windows $e^2$ to $j^2$, the fact that the unit or panel #2 is indicating the presence of trouble being designated at the window $f^2$ by the appearance of the figure 2. The pilot light such as $C^2$ may comprise a fixture surmounting the panel board as shown in Fig. 1, and may include a red light, this pilot light being shown illuminated in Fig. 1 for visibly indicating the fact that panel #2 is the trouble recording panel.

For operating the trouble indicating signals $a$, $b$, $c$, etc., in response to an abnormal condition of the plant equipment the signals are connected to the plant apparatus and machinery, a signal being individual to a piece of apparatus. The signal $b$ for illustration is connected to be operated by an abnormal condition of the generator damper by means of a circuit which comprises the conductor 10 connected to the positive terminal of the protecting bus, conductor 11 connected to a normally open switch 12 operated by the generator damper and closed by the closing of the damper as under abnormal conditions, conductor 13, conductor 14, the signal $b$, conductor 15 and the conductor 16 connected to the negative terminal of the protecting bus. This circuit it will be seen is normally open at the switch 12 and upon occurrence of trouble the circuit is closed by the closing of the switch 12 for energizing the signal $b$ to effect the signal indication. The other signals such as $a$, $c$ and $d$ are similarly associated with other apparatus, the fire alarm signal $a$, for example, being connected to such other apparatus by a circuit comprising the positive conductor 10, the fire alarm system (not shown), the conductor $14^a$, the signal $a$ and the conductor $15^a$ connected to the negative line 16, the signals $c$ and $d$ being similarly connected as by means of the conductors $14^c$, $15^c$, and $14^d$ and $15^d$. The other signalling means of the other panels such as the signals $a'$, $b'$, $c'$ and $d'$ are connected in like manner to the protecting source of energy and to the apparatus protected.

For operating the unit designating means B and B' I provide a plurality of normally open circuits to the signalling elements thereof operable when closed for indicating the trouble recording unit. More specifically each of the panels is provided with an energizing circuit operative for energizing the unit light corresponding to the number of the panel and also the like unit lights of all the panels, this circuit for panel #2 comprising the conductors 10 and 11, normally open switch 12, conductors 13 and 14, a conductor 17, conductor 18, normally open contacts 19 and 20, conductor 21, a common conductor 22, conductors 23, 24 and 25, the signalling element $f$ indicating #2 and common conductor 26 connected to the negative line 16. Connected in parallel with the designating signal $f$ of panel #2, are the like designating signals of the other panels such as the signal $f'$ of panel #1, so that all corresponding designating signals are energized at the same time, signal $f'$ being connected in parallel with signal $f$ by connecting one terminal of the signal $f'$ to a common conductor 26' connected to a negative conductor 16' and by connecting the other terminal to the signal $f$ by means of the conductor 27. Like corresponding unit lights on all the panels will thus be simultaneously illuminated so that any panel will be informative of that panel on which the abnormal condition signal indication appears.

The pilot light C or C' of a panel is energized only on a trouble recording panel to distinctively designate the trouble station and for operating the light it is connected across the conductors leading to the unit designating light of that panel. This is shown for example on panel #2 by connecting the light C across the conductors 23 and 26 by means of the conductors 28 and 29.

In the preferred arrangement the circuit to the elements of the unit designating means B and C is controlled by the operation of the circuit to the signalling means $a$, $b$, $c$ or $d$, and to this end there is provided a circuit which comprises conductors 10 and 11, switch 12, conductors 13 and 14, conductors 17, 30 and 31, a relay magnet 32, conductor 33, normally closed contacts 34 and 35, a conductor 36, and a common conductor 37 connected to the negative line 16, the relay 32 being provided for controlling a circuit controlling armature 38 provided with a switch element 39, this circuit being normally deenergized at the open switch 12.

From the above described arrangement it will be seen that when the switch 12 is closed upon occurrence of a defect, a first circuit to the signal $b$ will be closed for energizing the same, a second circuit to the relay 32 will be closed for energizing the latter, energization of the relay causing the attraction of the armature 38 and the closing of a third circuit at the contacts 19 and 20 bridged by the switch element 39, the said third circuit energizing the unit designating means $f$, $f'$, etc., and C.

Thus when an abnormal condition of any apparatus is present the same will be visibly indicated at the panel local thereto such as the panel #2 described, and the fact that an indication is present on the panel will be differentially designated at that panel by the pilot light C and will be designated on all panels by the elements $f$, $f'$, etc., of unit designating means B, B', etc., so that the attendant may be quickly informed by recourse to any of the panels and by the pilot light of a particular panel as to which panel demands attention, and will be intelligently and quickly directed to the seat of trouble.

It will be noted that the other unit designating signals such as *e* and *e'*, *g* and *g'*, etc., are inter-related so that the occurrence of a defect at any other panel will be properly designated on all the panels. To this end the signals *e* and *e'* are connected in parallel and operated by the circuit on panel #1, like terminals of these signals being connected to the conductors 26 and 26' respectively, which lead to the negative lines 16 and 16' respectively, the opposing like terminals being connected together by the conductor 40, the said conductor 40 being connected to a conductor 23' on the panel #1 and to a circuit corresponding to that described for panel #2. Likewise the signals *g* and *g'* are connected to the negative lines and together by conductor 41, the signals *h* and *h'* by the conductor 42, the signals *i* and *i'* by the conductor 43 and the signals *j* and *j'* by the conductor 44, these signals being in turn connected to be operated by the circuits of panels 3 to 6 respectively (not shown).

As heretofore indicated a further principal object of the present invention comprehends the provision of a system in which any transitory and self-restoring abnormal condition in plant apparatus is indicated by the signalling system so that the attendant may learn of the trouble even though the defect disappears before the attendant can reach the panel or observe the panel indication. To these ends I provide means for causing the signal indication to persist regardless of the self-restoration of the apparatus associated therewith, and in the preferred form of the invention I provide holding circuits for the signal indications and the unit designations, these holding circuits being normally open and being closed when the controlling circuits for the signals are closed, the construction being such that the holding circuits remain closed in spite of the opening of the controlling circuit due to the self-restoration of the apparatus. For causing the indication of a signal such as *b* to persist I provide the holding circuit which comprises the positive conductor 10, conductor 45, a common conductor 46, a conductor 47 connected to a normally open contact 48 which upon energization of the relay 32 is closed by the switch element 39 for closing the circuit to the signal *b* through the contact 19, conductors 18, 17 and 14, the signal element *b* and conductors 15 and 16 to the negative bus terminal. The holding circuit for the unit designating means B and C may be similarly traced from the conductor 45, conductors 46 and 47, contact 48 normally open and closed when the relay 32 is energized by means of the switch element 39, contact 20, conductors 21, 22 and 23 to the conductors leading to and through the unit signal *f*, and the pilot light C connected in turn to the negative conductor 16. For maintaining these holding circuits closed the energization of the relay 32 provides a circuit for maintaining the relay energized irrespective of the opening of the energizing circuit thereto, and to this end I provide a switch circuit which includes the conductors 10, 45, 46, 47, contact 48, switch element 39, contact 19, conductors 18, 30 and 31, the relay magnet 32, conductor 33, contacts 34 and 35, and conductors 36 and 37 connected to the negative conductor 16. By the provision of this means it will therefore be seen that when a defect occurs the signal indication controlled by the defective apparatus and the unit designating means will be energized and will be maintained energized so that the indications and designations will persist regardless of the self-correction of the defect.

For the purpose of sounding an alarm when a signal indication is present on any of the panels I provide an audible signal means such as the sounding horn 49 which may be operated by a local circuit including a conductor 50 connected to a positive terminal as a source of energy, electro-responsive signal producing means 51, conductor 52, contacts 53 controlled by a time relay plunger 54, conductors 55 and 56, conductor 57, normally open contacts 58 and 59, conductor 60 and conductor 61 to the negative terminal of the source of energy. The time relay plunger 54 is energized by means of coil 62 connected in parallel across the conductors 50 and 55 by means of the conductors 63 and 64 respectively so that after a predetermined period of operation of the audible signalling means 49, the contacts 53 are opened by movement of the plunger 54 for discontinuing the audible signalling. This circuit to the signal 49 is normally open, as described, at the contacts 58 and 59, and is closed by actuation of a relay armature 65 controlled by a relay 66 connected in a normally open circuit closed upon the occurrence of a defect, the circuit including the conductors and contacts heretofore described which lead from the positive line and are connected to the common conductor 22 to which one of the terminals of the relay 66 is connected, the other terminal of the relay being connected to the negative line 16 by means of the conductor 67.

It is preferred to provide only one audible signal for the entire plant and to control this signal from one panel, and to this end all the controlling means for the signal are mounted on a single panel such as for example the panel #2. Accordingly there are provided a plurality of relays such as 66' and 66² connected to the common conductors 22' and 22² of the other panels and controlled thereby, the said relays being in turn connected by means of conductors 67' and 67² to the negative line 16 common to all panels, the contacts and switch elements such as 58', 59', 65', 58², 59² and 65² being associated with the signal circuit and being connected to the conductors 56 and 61 leading thereto.

As heretofore indicated it is a further principal object of my present invention to provide a system in which after a defect is indicated by the unit designations on the panels, the occurrence of subsequent defects may likewise be designated in and during the time taken for the correcting of the first defect. To this end my invention includes the provision of means for clearing the unit designations after the signalling indication has been observed by the attendant with the arrangement such that the act of clearing the unit designations will inform the attendant whether or not the defect in the apparatus is of a transitory or permanent nature. More specifically to accomplish this I provide circuit means for deenergizing the relay 32 which controls the circuits to the unit designating means, the said circuit means including a circuit manually operable by the attendant comprising a manually operable normally open switch 68 connected to the positive line 10 by means of a conductor 69 and to the negative line by means of the conductor 70, electromagnet coils 71, 72, 73 and 74 in series and conductors 75 and 37. Closing the switch 68 energizes the electromagnet coils including, for example, the coil 72, which causes the actuation of an armature 76 controlled by the coil 72 provided with an insulated spreader 77 cooperating with the contacts 34 and 35 for opening the same, the opening of these contacts causing the desired deenergization of the relay 32. Upon the deenergization of the relay 32 it will be seen that in the event that the trouble has cleared itself, the signal indications and designations will all be cleared, and in the event that the trouble is not transitory the circuits to the designating means B and C will be opened for deenergizing the same while the circuit to the indicating signal $b$ will remain closed.

For the purpose of maintaining the armature 76 in a circuit opening position so that release of the switch 68 by the attendant will retain the apparatus in cleared condition, I provide a holding means for the armature 76 which includes a circuit closed by the actuation of the said armature 76, the said circuit being traced from the conductors 10 and 11, switch 12, conductors 13, 14, 17 and 30, a conductor 78, normally open contacts 79 closed by a conducting element 80 forming part of the armature 76 when the same is actuated, a conductor 81, relay coil 82 and conductor 83 connected to the common conductor 37. With this circuit it will be seen that when the armature 76 is actuated for opening the contacts 34 and 35 the contacts 79 will be closed for energizing the electromagnet 82 for in turn maintaining the armature 76 in attracted position. With this arrangement it will be furthermore seen that when the trouble has been rectified by the attendant and the switch 12 opened, this holding circuit to the electro-magnet 82 will be opened for clearing the clearing means and placing the entire panel in normal condition.

While the circuits required for the operation of the signal $b$ alone have been traced in sequential detail it will be understood that the circuits shown for the other signalling elements may be similarly traced, the unit designating means and the signal $a$ being controlled by the operating elements generally designated as X and being cleared by the operating elements generally designated as X', the operating elements for the signals $c$ and $d$ being generally designated as Y, Y' and Z and Z', these operating elements being the same as heretofore described in connection with the operation of the signal $b$, it being however, understood that all of the clearing elements on one panel are controlled from a single manually operable switch 68 by the placing in series of the coils 71, 72, 73 and 74 referred to.

The manner of using and operating my annunciator system will in the main be fully apparent from the above detailed description and operation thereof. It will be further apparent from the foregoing that I provide a system especially applicable to the problems confronting the atttendant in large sized plants so that all the generating units of the plant and the many pieces of apparatus required therefor will be properly and efficiently protected by integrity detecting means so that the attendant may be quickly and intelligently directed to that particular signalling unit recording the defect and so that he may be rapidly and properly advised as to the nature and location of the defect whether transitory or permanent, expeditious detection of any abnormal condition in the plant apparatus being thereby afforded with substantial efficiency and economy.

While I have shown my system in the preferred form it will be obvious that many changes and modifications may be made in the structure and general arrangement disclosed without departing from the spirit of the invention defined in the following claims.

I claim:

1. An annunciator mechanism for power plants or the like comprising signalling means operative for indicating an abnormal condition in plant apparatus, designating means for designating the presence of an abnormal condition signal indication, and clearing means operative for clearing the designating means only if the abnormal condition persists, and for clearing both the signalling means and the designating means if the abnormal condition disappears.

2. An annunciator mechanism for power plants or the like comprising signalling means operative for indicating an abnormal condition in plant apparatus, designating means for designating the presence of an abnormal condition signal indication, and unitary manually operable clearing means operative for clearing the designating means only if the abnormal condition persists and for clearing both signalling means and the designating means if the abnormal condition disappears.

3. An annunciator mechanism for power plants or the like comprising electrically controlled signalling means, a normally open circuit therefor operative when closed for indicating an abnormal condition in plant apparatus, designating means for designating the presence of an abnormal condition signal indication, a normally open circuit therefor, means for closing the second circuit when the first circuit is closed, and clearing means for opening the second circuit.

4. An annunciator mechanism for power plants or the like comprising electrically controlled signalling means, a normally open circuit therefor operative when closed for indicating an abnormal condition in plant apparatus, designating means for designating the presence of an abnormal condition signal indication, a normally open circuit therefor, means for closing the second circuit when the first circuit is closed, and manually operable clearing means operative for opening the second circuit only if the abnormal condition persists and for opening both circuits if the abnormal condition disappears.

5. An annunciator unit for power plants or the like comprising signalling means, a normally open circuit therefor, a unit designating means, a normally open circuit therefor, a third normally open circuit including a relay, said relay controlling the opening and closing of said second circuit, means operated by an abnormal condition of plant apparatus for closing said first and third circuits and for energizing the relay to close the second circuit, and clearing means for deenergizing the relay to open the second circuit to clear the designating means.

Signed at New York city, in the county of New York and State of New York, this 23rd day of November, A. D. 1922.

LLOYD E. ONEAL.